United States Patent Office 2,830,902
Patented Apr. 15, 1958

2,830,902
PROTEIN FOOD PRODUCTS AND METHOD OF MAKING SAME

Mortimer Louis Anson, New York, N. Y., and Morton Pader, West Englewood, N. J., assignors to Lever Brothers Company, New York, N. Y., a corporation of Maine No Drawing. Application August 16, 1952
Serial No. 304,844

9 Claims. (Cl. 99—14)

This invention relates to manufactured protein food products and to methods of making such products. In the preferred embodiments of the invention, the protein products have a texture and consistency simulating the characteristic texture and chewiness of meat.

We have found that very desirable products, particularly food products which simulate to a remarkable extent the chewiness, moistness and texture of cooked meats, both in the mouth and in appearance, can be produced without difficulty as a result of our discovery that protein gels of widely different but predeterminable chewiness and texture can be made and that these gels are particularly suitable for use in food products. These results are accomplished by our discovery also of the several factors which control the formation of the desired product characteristics and their relationship to each other. The present invention permits also the simulation as to color, and taste of meats of widely different types and textures.

According to the invention there is provided a food product comprising a protein system in the form of a chewy protein gel and a process for making a food product which comprises three essential steps, namely (a) adjusting the composition of a protein-water system, in particular the pH and the solids content, to a composition conducive to gel formation, (b) the shaping of the system and (c) the application to the adjusted system of such heat as is necessary to produce a chewy gel. The shaping may take place before or after either of the other steps of the process.

In general, the method of the present invention comprises the steps of separating the protein, adjusting the pH and, if necessary, the protein content of the suspension of the separated protein within relatively narrow limits to form a gel precursor, and by subsequent appropriate treatment usually including controlled heating, forming discrete particles of a chewy gel.

As will become apparent from the more detailed description hereinafter, considerable latitude is permissible as to the order and precise manner in which some of the steps of this method can be carried out, the particular choice of procedure and order of steps being dependent primarily upon the type of food products desired, and, to a certain extent, also on the equipment that is available.

The food products in accordance with the present invention may vary considerably as to form and composition. They all have in common, however, the pressure of chewy protein gel or of the precursor of chewy protein gel, preferably in a product of non-homogeneous texture.

In general, as will be later described, a non-homogeneous product can be formed from the discrete particles of the chewy protein gel by coating, dusting, or otherwise blending or combining them with any desirable combination of edible materials of different characteristics as to texture and chewiness. In this way larger chunks, cuts or slices of meat of non-homogeneous texture, such as pot roast and the like, may be simulated, or, if desired, products similar to hamburgers, meat patties, meat loaves, sausages, may be made.

Proteins of animal or vegetable origin generally may be used in the preparation of the products of this invention. The proteins that are preferred are those which have a protein nutritive value higher than is usually found in the grain proteins such as those obtained from wheat. Among the proteins preferred for the purpose of the present invention are heat denaturable proteins, for instance oil seed proteins, such as those obtained from peanuts and soy beans, and fish proteins and also casein when processed under certain special conditions hereinafter described.

CERTAIN TERMS DEFINED

Before proceeding with a more detailed consideration of the several features of the invention, we have set forth an explanation of our usage or meaning of certain terms which we have relied upon in defining our invention.

The term "suspension" is used to mean any system comprising protein and water.

The term "gel precursor," as used herein, refers to a system essentially of protein and water which is capable of forming a chewy protein gel, usually on being heated.

A "chewy gel" or "chewy protein gel" refers to a system essentially of protein in colloidal dimensions in water and which when pieces of substantial size are chewed in the mouth has the physical properties of resilience, elasticity and resistance to shear. These properties and others of the gel are included in the more descriptive and inclusive term "chewy." It also preferably has the characteristic of heat irreversibility i. e., it essentially retains its firmness when subjected to heat, particularly in products which are to be subjected to heat processing or normal cooking conditions prior to consumption. The chewy gel has a hydrated structure and has, in the absence of other substances, a smooth moist taste in the mouth. The pH of the chewy gel is usually near neutrality. In appearance the chewy protein gel is smooth and uniform and, unless other materials are present which change its appearance, slices of suitable thinness are transparent or translucent. Other substances such as carbohydrate materials, non-chewy proteins, fats, flavoring materials, coloring materials, vitamins and minerals may be suspended or dissolved in the protein gel or coated on the gel particles.

It is to be understood, of course, that only nontoxic and compatible materials may be combined with the chewy protein gels of this invention for the purpose of making food products.

The term "discrete particles," as used herein, refers to small chunks, to elongated shapes such as cylinders of relatively small diameter, which diameters need not be uniform along their length and possibly having one or more flat sides, and to strips, slices, slivers, strands, and ribbons, the dimension of which in at least one direction is of the order of a fraction of an inch. The term may also include small chunks or particles of any such prior formed particles.

The term "shaping" as used herein with reference to the production of "discrete particles" is intended to include any operation, such as slicing, chopping, extrusion, pressing, molding and the like, that will subdivide a mass of gel precursor or chewy gel into discrete particles of a desired shape.

The term "additive" is used to include substances which are added to the gel phase, in which case they may be considered as inner additives, or which are in a relationship external to the gel phase, in which case they are outer additives. Some substances may fall within both classifications, dependent on the nature of their use. The additives may comprise components modifying the character of the chewy gel per se, or the final unhomogeneous product, such as texturating agents, binders, anti-binders and flavoring, coloring or fortifying agents. In some instances, the additive may not become fully effective until after further treatment of the unhomogeneous product.

GENERAL PROCEDURE FOR FORMING MEAT-LIKE PRODUCTS

There are several embodiments of the general procedure for making non-homogeneous meat-like products based on chewy gel. In one of these embodiments a mass of chewy gel is prepared, shaped into suitable discrete particles and then mixed with the outer additives. In another embodiment the gel precursor is shaped, mixed with outer additives and the mixture is further processed, usually by further heating, to convert the gel precursor into chewy gel. The latter embodiment has several variations. The gel precursor can be partially set up by intermediate heating and then shaped and mixed with outer additives before final chewy gel formation. It can be shaped, e. g., by extrusion, without first being partially set up by intermediate heating, and then mixed with outer additives, and finally converted into a chewy gel with or without a setting up of the precursor to various degrees after the shaping and before admixture with the outer additives.

FORMATION OF THE GEL PRECURSOR

The nature of the gel precursor and the manner of its formation may vary widely, depending in part upon the type of product ultimately desired, the source of the protein, the composition of the outer additives and other factors, as hereinafter discussed. The gel precursor may be in the form of a suspension, slurry or composed of precipitated protein in water, or it may even be in the form of a concentrated solution in water. The method of formation of the gel precursor may involve simple extraction of the protein from the parent material or extraction and precipitation thereof at room or elevated temperatures, followed by adjustment of the precipitate to a condition in which it will become capable of being converted into a chewy gel, preferably upon being heated.

We have made the surprising discovery that there are many advantages which have heretofore not been recognized in having the heat denaturable protein in a gel precursor be in denatured, preferably heat denatured, form. One preferred type of procedure for preparing a suspension of denatured protein involves separating the protein from substances associated with it in the natural product to an extent sufficient to allow subsequent gel formation and precipitating the protein before, during or subsequent to the application of heat to the system. In this type of procedure the system is heated to a temperature above about 70° C. preferably within the range of about 85 to 100° C.

A preferred form of this procedure, referred to herein as "hot precipitation," involves forming a protein extract by suspending the ground meal of such parent materials as peanuts, soy beans and the like in water adjusted to a pH above the isoelectric point of the protein in order to dissolve the proteins and to leave undissolved the carbohydrates and certain of the coloring materials and off-flavors, and thereafter subjecting the suspension to filtration, centrifugation or the like to separate the extract, i. e., the dissolved protein, from the undissolved material. The extract is then heated and maintained at an elevated temperature for a short interval of time, whereafter its pH is adjusted to a value at or near the isoelectric point of the protein. This results in the precipitation of the protein from the extract. The preferred length of the time interval of heating before precipitation is roughly inversely proportional to the temperature, i. e., longer at low temperature and shorter at high temperature. At a temperature of about 95° C., approximately 1 to 5 minutes are sufficient to give excellent results with a typical extract of peanut protein.

We have also found that suitable gel precursors may be prepared from protein suspensions obtained by hot precipitation with salts of cations such as calcium at a pH somewhat higher than the isoelectric point.

The characteristics of the gel precursor and more particularly the solids content thereof are also influenced to a considerable extent by the promptness with which the protein precipitated by the hot precipitation embodiment of this process is subjected to centrifugation or other manipulation and in part by the rate of addition of the precipitating acid, preferably used to bring the pH of the extract to or near the isoelectric point of the particular protein, to the hot extract. Thus, for example, if the acid is added rapidly and if the centrifugation of precipitated peanut protein is begun immediately after the pH of the heated protein extract has been brought to or near the isoelectric point of the protein, the protein mass after centrifuging at about $1800 \times g$ will have a protein content of as high as about 40–45%. If, however, the acid is added rapidly but centrifugation is begun about one-half minute after the protein extract is brought to the isoelectric point, the protein content of the product will range in the neighborhood of about 30–35%. If it is desired to have a protein mass with a lower protein content, e. g., approximately 27–31%, the acid should be added slowly. For example, the addition of acid to 200 liters of an extract containing about 20% protein should take a minute or more, and centrifugation should be delayed for a minute or more.

While it is to be understood that we are not to be limited by any theory advanced, it is believed that the superior structure of the protein gel precursor made of protein precipitated by slow addition of acid to a hot extract may be due to the additional hydration which is imparted to the protein precipitate when it is heated on the alkaline side of the isoelectric point. This extra hydration is of advantage when the shaping is accomplished by extrusion.

The advantages of having heat denaturable protein in a gel precursor in a denatured, preferably heat denatured form, are considerable and apply to all of the embodiments of the process referred to under the heading, "General Procedure for Forming Meat-Like Products." A suspension of denatured protein in a gel precursor has more structure and firmness than is possessed by a corresponding suspension of undenatured protein. Furthermore, although application of heat, e. g., autoclaving, converts the suspension of either denatured and undenatured protein into a chewy gel, intermediate heating, such as, steaming for a short period, hardens a typical gel-forming suspension of denatured protein into a partially set up gel whereas similar intermediate heating sets up a corresponding suspension of undenatured protein very much less. The partially set up suspension of denatured protein can more readily be shaped into the desired discrete particles without undue breakage. In addition, such a partially set up suspension, whether shaped after intermediate heating or shaped, e. g., by extrusion, before the intermediate heating, can be mixed with the outer additive without undue break up of the discrete particles and the mixture can be then further heat processed without undue interaction between gel precursor and outer additive.

A suspension of denatured protein, under the conditions described herein, has enough structure to retain its shape and separate identity after being extruded, like spaghetti, through small holes. The shaped suspension can then be converted into the desired chewy gel by adequate heating process with or without intermediate heating treatment. In contrast, a suspension of undenatured protein, at the order of concentration herein described, does not retain its shape after extrusion through small holes but the extruded material runs together.

Thus in one way or another the preliminary denaturation of the protein used for the gel precursor makes possible the preparation of a mixture of shaped gel precursor and outer additive before the final formation of the chewy gel by a final heating treatment. Even, however, if it is desired first to make a mass of gel and then convert it into the desired discrete particles before mixing with the outer additives, there are still advantages in starting with a suspension of denatured protein. One of the primary advantages is that a suspension of denatured protein can be conveniently and safely autoclaved in an open container. As the suspension is heated to an intermediate degree the suspension becomes partially set up and this partially set up suspension does not become porous or overflow when heated further. On the other hand, a suspension of undenatured protein becomes porous and tends to overflow when autoclaved in an open container. These undesirable results can be avoided by autoclaving such a suspension in a closed container such as a sealed can.

The gel precursor may also be formed from protein extracted and precipitated at or near room temperature. The precipitation may be effected either by addition of acid until the pH of the extract reaches or approaches the isoelectric point of the particular protein or by the addition of a salt, such as a calcium salt, which acts to bring about precipitation at pHs considerably higher than the isoelectric point.

The protein suspension, whatever the method of protein separation used, is adjusted to a pH and, if necessary, as to protein content and other factors to bring it into a condition conducive to the formation of a chewy gel. For example, in the case of suspensions of soy or peanut protein prepared as described in the specific examples hereinafter, the pH is adjusted upward to a value higher than the isoelectric point, usually above about 6.0 or higher, by addition of basic materials, such as for example sodium hydroxide. It is desirable not to raise the pH of the protein suspension to a value higher than one which would adversely affect taste. We have found that the pH value above which taste is usually adversely affected is about 8.0, and prefer to adjust the pH to a value between about 6.5 and 7.5. This preference is based upon the discovery that within this range the pH is sufficiently high to insure gel formation, usually upon subsequent treatment of the gel precursor, and at the same time sufficiently low to avoid imparting objectionable alkaline flavor to the gel ultimately produced. The protein content of the precipitated protein mass usually would be adjusted to a value between about 18% and about 45 to 50% if a protein content within this range has not already been obtained, for instance by preselecting the time interval between precipitation of the protein and centrifugation thereof. We prefer to have the protein concentration within the range of about 20 to 40% and have found generally that protein contents within the range of about 25 to 35% in the gel precursor uniformly yield gels of desirable chewiness. If chewier gels are desired, the protein content should be correspondingly increased. Conversely, if less chewy gels are desired, the protein content should be decreased. It will be appreciated that the degree of chewiness desired in the final product is to a certain extent a matter of individual preference and taste and that this invention, therefore, is not to be limited to a method pertaining to any particular degree of chewiness.

We have discovered that a gel somewhat like the heat irreversible chewy peanut protein gels described can be prepared from casein by a special technique which involves controlling the solubility of the casein by adjustment of pH and the addition of a precipitating salt. For example, skim milk or a solution of casein is heated to 95° C. at a pH of about 6.8 and the protein is precipitated in the presence of about 0.1 N calcium salt at a pH of about 6. The precipitated casein is collected, e. g., by centrifugation, and then heat processed usually by autoclaving, with or without the adjustment of the concentrations of protein and calcium salt and small further adjustment of the pH. Advantage can be taken of this technique to use casein in some of the ways described for the use of heat denaturable proteins.

FORMATION OF CHEWY GELS

The exact procedure for converting the gel precursor into chewy gel is dependent in part upon the type of product desired and in part upon the procedure followed in the preparation of the gel precursor.

Whatever the method of producing the gel precursor, it is usually heated for a time and at a temperature sufficient to result in the formation of a gel. Obviously, the larger the mass, the longer it will require to gel the entire mass. We have observed that within reasonable limits excessive heating does not have any deleterious effects. While heating is not necessarily essential to gel formation, we prefer to heat the mass to a temperature above the boiling point of water while avoiding dehydration of the mass. It is desirable to avoid temperatures higher than about 300° F. A preferred method of forming the gel is that of autoclaving by subjecting it to steam at superatmospheric pressure. This, in addition to raising the temperature of the mass to a point at which gel formation takes place readily, has the additional advantage of avoiding dehydration before the chewy gel forms.

PREPARATION OF PRODUCTS

As suggested in the general statement of procedure for preparing final food products, one embodiment is to form the chewy gel, shape it and admix the discrete particles with outer additives. A second embodiment involves generally the formation of the chewy gel after shaping and admixture with outer additive. In connection with the second embodiment, a gel precursor may be partially set up before shaping, such as by steaming, then shaped suitably, before admixture with outer additives. Alternatively, the precursor may be shaped, e. g., by extrusion, then admixed with outer additives, with or without intermediate setting up to any desired degree.

Discrete particles of chewy gel formed by any method may be used with suitable outer additives for producing a heterogeneous mass similar to comminuted meat patty or hamburger, or they may be used as such in combination with ground meat. If desired, the shaping of the gel or gel precursor can be combined with admixture of outer additive, e. g., by the use of a suitable grinding technique. The chewy characteristics of the gel particles formed can be controlled and the texture of the final product can be adjusted to form the most desirable combinations with outer additives, ground meat or combinations thereof.

Several of the variations of the method of this invention are particularly suitable for the preparation of products which in texture resemble unground meat, such as pot roast, and which consist of aligned, elongated discrete particles, such as cylinders, of chewy gel separated from one another by outer additives which influence the taste and texture of the final product. The chewy gel may be formed as a mass and then converted into elongated particles before being mixed with the outer additives. Usually it is more practicable to form a mat of elongated particles of gel precursor separated by outer additives and then to form the chewy gel by further heating the mat. After a suitable suspension of protein has been extruded into the desired elongated particles the extruded particles can be partially set up by intermediate heating before being mixed with the outer additives in wet or dry form. We have further found that intermediate heating of the extruded gel precursor before mixing with the outer additives can be omitted if the mat is formed by coating the extruded particles with dry outer additives as the particles are formed and layering them in substantial alignment. Thus the dry mat, which is easily handled and autoclaved, is formed from the moist weak cylinders by the novel use of dry outer additives.

The outer additives, in addition to influencing the taste and texture of the product by their own characteristics when finally processed, also serve the purpose of preventing fusion of the discrete particles such as extruded cylinders or the like. We have found that starch and materials containing starch are especially useful for the prevention of such fusion which would otherwise take place readily, especially if the particles are not partially set up by intermediate heating. The extruded cylinders tend to stick to each other wherever they touch and when autoclaved, fuse together at the points of contact. Even very small amounts of starch prevent this sticking and fusion.

In one such procedure the gel precursor is extruded to form thin, substantially continuous cylinders which may be arranged or laid in substantial parallelism to form a mat or mass of relatively substantial size. The type of product ultimately desired is controlled to some extent by the diameter of the cylinders utilized, a larger diameter of cylinder acting in combination with suitable binders to give a coarser texture to the mat. The cylinders may have one or more flat sides and need not be uniform in cross section. One or more outer additives may be used to obtain the desired texture, simulating meat. The cylinders so formed, for example, may be subjected to (a) coating with an outer additive designed to impart desirable characteristics of heterogeneity, texture, appearance and, if desired, color, flavor or the like to the final product and then to autoclaving; (b) steaming sufficiently to form a partial gel, coating the partly gelled cylinders with an outer additive, and then autoclaving; and (c) autoclaving followed by coating with an outer additive.

In these embodiments, the outer additives serve not only the function of improving the taste and the texture of the final product, but also, as mentioned above, the important function of preventing a complete fusion of adjacent discrete particles of gel precursor or partially set up protein gel. Thus, for example, cylinders of the gel precursor may be dusted with a combination of starch and skim milk powder and placed in parallel relationship to form a mat. This mass of adjacent but non-fusing cylinders may then be compacted by the application of pressure, such as by a roller, and subsequent autoclaving. The starch component for example acts essentially as an anti-binder in that it prevents adjacent cylinders of the incompletely gelatinized protein from sticking together and thereupon forming a homogeneous mass not resembling meat from the physical point of view of texture and chewiness or taste. A function of the skim milk powder additive in this embodiment is that of binding the discrete cylinders of protein gel together so that they will not fall apart in the final product. Depending upon the type of product, the skim milk powder component can be omitted and starch or flour may be used alone.

The final products produced in accordance with these embodiments simulate the fibrous texture, chewiness and structure of meats such as pot roast, roast beef, or the like.

It is also within the scope of the invention to draw cylinders of partially or completely set-up protein gel through a bath of liquid fat or other additive, then to form a mat of more or less mutually parallel and discrete cylinders coated with the additive and then, if necessary, to subject the mat thus formed to further processing such as autoclaving or steaming.

Suitable flavoring, coloring material and fortifying agents, if desired, may be incorporated at any stage in the preparation of the food products to assist in the simulation of protein foods such as various types or cuts of meat. These ingredients if added to the gel phase must be of such a nature and must be added in such a way as to be compatible with the gel desired and its creation. These components, however, may be external to the gel phase as are the binders, anti-binders and other texturing agents, in which case they may be classed as outer additives.

Protein food products in a preferred form can be produced by our development which are heat irreversible and which can be roasted, broiled or fried to form a tasty-meat-like dish without liquification by heat and loss of form or texture. In addition, the textured form of product resulting from the production of a mat for example of substantially aligned cylinders and suitable outer binders the gels can, if desired, be chopped up for use in forming hamburgers or meat patties.

Another important feature of our invention is that certain of the final products, for example, when in the form of a product simulating unground meat, are susceptible to easy dehydration and subsequent rehydration to substantially their original texture. This constitutes a considerable advantage over ordinary dehydrated meat which is extremely difficult to rehydrate and which, therefore, ordinarily is not marketed in a dehydrated form. The products of the present invention may be dehydrated by a simple drying procedure and may be rehydrated easily by the ultimate user preferably in boiling water. The ease of dehydration and rehydration is facilitated by having the shape or form of the product small in one dimension, by having the discrete particles of gel small in at least one direction, by having the outer additive water absorptive, which facilitates wetting and penetration of water, and by slicing the mat transversely so as to expose the cylinder ends.

CERTAIN OF THE VARIABLES AFFECTING PRODUCT CHARACTERISTICS

The taste, structure and appearance, as well as the chewiness of the ultimate product, are dependent to a greater or lesser degree upon a number of interdependent variables, some of which, such as the method of extracting and precipitating the protein and the pH and solids content of the gel precursor, have already been considered. Other interdependent variables affecting the characteristics of the final product include the source of the protein, the amount and nature of any salts in the gel precursor, the concentration, manner of application and effect of additives to the gel phase (inner additives) and external to the gel phase (outer additives). Additional variables are the size and shape of the particles of chewy gels and the amount of heat, if any, applied to the gel precursor, i. e., the temperature, manner and time of heating.

Among the sources of protein, we have found oil seed meals, such as peanut and soy bean meal to be very readily susceptible of treatment to produce a heat irreversible gel. Casein is also susceptible of treatment to produce a gel of the desired character. Other protein sources, particularly those having a higher protein nutritive value than the usual cereal proteins, are adaptable to the methods of this invention.

The acid used to precipitate the protein may be hydrochloric, phosphoric, sulfuric, lactic, or any other acid that is suitable for food use and is of sufficient strength to bring the pH down close enough to the isoelectric point to obtain precipitation without diluting unduly the protein extract. The extent and the direction of the effect which the presence of salts such as calcium salts, sodium chloride and phosphates in the gel precursor has on gel formation or on the character of the gel depends on the nature and concentration of the salt and on the particular protein system. We have found, for instance, that calcium chloride has a more marked effect than sodium chloride. To avoid inhibiting the formation of a suitable gel from a peanut protein gel precursor, for example, it is important to insure that only very small amounts of calcium are present in the gel precursor. If present in larger amounts, the calcium must, therefore, be sequestered by a suitable sequestering agent, such as, for example, sodium tripolyphosphate. On the other hand, the presence of an appreciable amount of calcium salt in a casein gel precursor, preferably accompanied by a lowering of pH to promote further depression of the solubility of casein, is desirable in promoting the formation of a heat irreversible, chewy gel. It is not necessary that all of the materials present with the protein in the protein source be removed, although it is, of course, desirable to remove materials having bad flavor or an undesirable color in so far as it is practicable. We have obtained excellent results with gels prepared from protein extracts containing as much as 4% of the insoluble residues present in the meal of the original protein source. The presence of relatively large proportions of such materials may inhibit the formation of a suitable gel.

The effect of protein concentration and pH of the gel precursor on the chewiness and toughness of the autoclaved gel has already been discussed. It may be added that when it is desired to form simulated meat slices or pieces of meat as distinguished from comminuted particles, the protein content of the precursor may be increased as the sizes of the extruded cylinders become narrower and finer. This tends to control the degree of chewiness obtained in the final product. Conversely, the larger the diameter of the cylinders, the lower should be the protein concentration of the gel precursor in order to obtain a given degree of chewiness. It should be borne in mind, however, that the chewiness depends in large part upon the protein content in the discrete particles of chewy gel as it occurs in the final product.

The higher the temperature of gel formation, the more quickly the gel is formed. Generally, it has been found preferable to keep the temperature of gel formation within the limits of approximately 220 to 250° F. Heating beyond that necessary for gel formation has not been observed to influence the character of the gel to any appreciable extent, although some deleterious effects may be obtainable by unreasonably prolonged heating. Insufficient heating results in a product having only weak structure and a pasty taste in the mouth. If heating is carried out at low temperature for a very short time, there may be practically no gel formation. The time of heating necessarily depends upon the size or volume of the mass, slab or mat of protein that is heated. Suitable gels can, however, be obtained without any application of heat, but in such instances the protein concentration in the gel precursor must be increased considerably above those contemplated when heating is utilized.

Generally, the incorporation in the gel precursor of such inner additives as carbohydrates and fat makes the resulting gel somewhat weaker and sometimes less gelatinous. The degree of weakening of the gel increases with increasing amounts of such inner additives.

The addition of gums, such as for example locust bean gum, usually reduces the rubberiness of the gel and tends to make it softer. Gums such as alginates, seaweed extracts, and locust bean gum may also be used to facilitate extrusion by making an extrudable product of smoother characteristics. The presence of the gums by virtue of their water absorption capacity also may be used to partially control the rehydration properties of a dehydrated gel.

In the preparation of comminuted meat-like products, such as hamburgers and meat patties, it has been found generally preferable to make the particles of chewy gel of irregular shape and in sizes varying from 1/8" to 1/4" in any given direction. It is to be understood, however, that smaller or larger particles, or mixtures of widely varying sizes and shapes of particles, may be utilized with desirable results. In the preparation of pieces of meat wherein the fibrous feel of real meat is simulated, the diameters of the cylinders of chewy gel depends upon the coarseness or fineness of the grain of the meat intended to be simulated. For example, it has been found desirable that the cylinders of chewy gel have diameters up to about 0.025 inch, preferably of the order of about 0.005 to 0.015 inch. Generally speaking, the sizes or diameters of the particles or cylinders should be smaller, the tougher and chewier the gel is. The size and toughness of the gel particles in turn depend upon the texture desired in the final product.

Generally, it is desirable that at least about two-thirds by weight of the final product be a chewy, heat irreversible gel. This of course may vary considerably, depending upon the texture desired, on the character and amount of additives, on the size and shape of the gel pieces, on the toughness of the individual gel pieces and on the concentration of proteins desired.

The additives external to the gel phase, i. e., outer additives, should generally not be as strong as the chewy gel and may, very desirably, consist or comprise a weakened protein gel. An important function of the outer additives is to make a non-homogeneous final food product and one which has a desired and pleasing texture. In this connection, the outer additives may be either a binder or anti-binder, depending in part on the form of the gel and the nature or texture of the final product desired. It is possible to use a blend of binders and antibinders or other texturating agents to achieve the desired result. The desirable rehydration properties of the final product also may be modified and partially controlled by the use of suitable outer additives such as soluble carbohydrates. In general, in making a product such as a meat loaf or a patty, the larger or tougher the discrete particles of chewy gel are, the stronger must be the binding ability of the additives. In making a product such as one having a texture similar to a pot roast, the parallel cylinders to a large extent may have an outer additive comprising an anti-binder, such as flour. However, certain additives, for example, fat, or flour, depending on the condition of use, may be either a binder, an antibinder or even an inner additive. Among the outer additives that are particularly suitable as texturing agents in the products of the present invention are proteins which may, if desired, be prepared from a portion of the original precipitate by adjusting the pH, protein content, additives or any combinations thereof in such manner that a distinctively weakened gel or even a non-gelatinous mass will be formed. Other outer additives are skim milk, casein, egg white, fat, soy bean flour, wheat flour, starch or combinations thereof.

The advantages and utility of the present invention will become further apparent from the following examples, it being understood however, that these examples are merely illustrative and are not intended as indicating limitations of either the method or the products produced thereby.

*Example 1*

PART A

Five kilograms of peanut meal prepared by solvent-extraction of lye-dipped peanuts, were suspended in 95 liters of water at 22° C. 240 cc. of a 2.09 N aqueous sodium hydroxide solution were added to the suspension. This suspension, which had a pH of 7.2, was stirred for 60 minutes and then centrifuged to remove the insoluble fraction of the meal.

84 liters of the extract were heated to 95° C. by the introduction of live steam and maintained at that temperature for 5 minutes. While stirring the heated extract, 304 cc. of 3.58 N hydrochloric acid were added, whereupon the protein was precipitated. The suspension of protein, having a pH of 4.6, was maintained at a temperature of 95° C. for an additional 5 minutes and then centrifuged at 1800×g to collect the protein. The protein suspension thus obtained had a solids content of 34%.

PART B 60 cc. of 2.09 N sodium hydroxide, 155 cc. of water and 12 grams of locust bean gum were added to 1000 grams of the protein suspension prepared in part A. The materials were thoroughly mixed and then broken down to a smooth paste by passing the mixture through a roller mill. The resulting smooth plastic mass (gel precursor) was at a pH of 7.1 and had a protein content of 28%.

PART C

The gel precursor prepared in part B was placed in the cylinder of a commercial macaroni extruder. The extruder had a die 2½" in diameter with several rows of holes 0.007" in diameter. The holes were staggered in such a manner that the extruded material, when deposited on a flat surface, was laid down as a single layer of substantially parallel cylinders. A 100-mesh stainless steel screen was inserted into the cylinder of the extruder immediately over the die to prevent clogging of the die by large pieces of protein which might not have been broken down in the roller mill or by foreign material.

The gel precursor was extruded onto a reciprocating table under the die, the table being moved at a rate just sufficient to collect the protein cylinders in substantial parallelism. As the cylinders were deposited on the table, they were dusted with a mixture of three parts wheat starch to one part skimmed milk powder and were gently compressed by "Teflon"-covered rollers. This procedure was continued until a mat, consisting of gently compressed layers of substantially parallel cylinders, dusted with the wheat starch-skimmed milk powder mixture, was built up to a height of 3". The mat contained 15% by weight of the wheat starch-skimmed milk powder mixture.

The mat thus prepared was placed in a wire mesh cage having substantially the same interior dimensions as the mat. The mat, in its cage, was then placed in an autoclave and heated for 15 minutes at 15 p. s. i. g. steam pressure in an atmosphere of live steam. The steam pressure was then released and the product removed.

The autoclaved product resembled, in texture, a piece of meat such as pot roast and was capable of being roasted, broiled, fried or boiled and thereupon converted into an entirely edible product having the chewiness characteristic of meat.

PART D

A portion of the product was sliced into slices 3/16" thick, cutting across the grain. The slices were dried in a shelf drier at 120° F. to a solids content of 86%.

The dehydrated slides were re-hydrated by placing them in a boiling beef-flavored gravy and cooking until the slices were completely rehydrated and tender.

Example 2

PART A

A gel precursor was prepared as described in parts A and B of Example 1, except that the addition of 155 cc. of water and 12 grams of locust bean gum in part B were omitted. As a result of this departure in the procedure, the protein content of the gel precursor was 32%.

PART B

The milled gel precursor thus obtained was extruded in the manner described in part C of Example 1, the holes in the die, however, being 0.014" in diameter and the protein cylinders being deposited in substantial parallelism upon a moving belt which passed into a steam chamber, wherein the protein cylinders were subjected to live steam at 200 to 212° F. for 5 minutes. The cylinders were then cooled by a draft of cool air and collected on a spool.

In a container 4" long, 2" wide and 1¼" high, 40 grams of the steamed cylinders, cut into 4" lengths, were aligned in 40 grams of a fluid suspension having a pH of 6.8 and containing 14% protein and 7% wheat flour, said suspension having been prepared by mixing 200 grams of the 34% solids protein suspension prepared as described in part A of Example 1 with 10 cc. of 2.09 N sodium hydroxide, 244 cc. of water and 34 grams of wheat flour, and breaking the mixture down into a smooth fluid suspension by passage through a colloid mill. The suspension was completely dispersed around the cylinders, each cylinder being coated thereby. The resulting mass, in its container, was placed in an autoclave and heated for 15 minutes at 15 p. s. i. g. steam pressure, the product being open to the live steam. The steam pressure was then gradually released, the product was cooled and removed from its container.

The meat-like product thus prepared was found to be capable of dehydration and rehydration in the manner described in part D of Example 1.

Example 3

A protein gel precursor prepared as described in part A of Example 2 was extruded through holes having a diameter of 0.010" in the manner described in part B of Example 2. The extruded cylinders were aligned on muslin-covered trays, placed in an autoclave and there subjected to the action of steam at 15 p. s. i. g. for 5 minutes.

60 grams of the autoclaved protein cylinders were cut into 4" lengths and aligned substantially in mutual parallelism. 30 grams of a smooth uniform paste composed of 11 parts skimmed milk powder, 22 parts wheat flour, 6 parts flavoring material and 61 parts water were thoroughly worked between the cylinders so that each cylinder was encased in the paste, alignment of the cylinders being maintained. The resulting product was placed in an open container 4" long, 2" wide and 1½" high and then, in its container, was subjected to steam at 212° F. for 30 minutes in a steam chamber. It was then cooled and removed from the container.

The product was similar to that of Example 1 except that the feel in the mouth was that of a coarser meat.

Example 4

A peanut protein gel precursor was prepared as described in parts A and B of Example 1, except that the amount of water added per 1000 grams of protein suspension was reduced to 72 cc. and no locust bean gum was added. This resulted in a gel precursor having a pH of 7.1 and a protein solids content of 30%.

The milled gel precursor was roughly rolled out into a sheet about ¼" thick. This sheet was placed on an open tray in an autoclave and subjected to steam at 15 p. s. i. g. for 5 minutes. The resulting sheet of gel was cooled and cut into rough, non-uniform pieces, varying in size, by a passage through a meat grinder equipped with a grinder plate having holes ⅜" in diameter and from which the cutting knife had been removed.

2 parts by weight of the ground pieces of gel were mixed thoroughly with one part by weight of smooth paste consisting of 54% of the peanut protein gel precursor prepared as described in parts A and B of Example 1, 23% of hydrogenated vegetable oil, 1% emulsifier, 15% flavor and 7% water. The resulting mixture was placed in a hamburger mold ¾" high and 3" in diameter and, while in the mold, was subjected to live steam at 212° F. for 20 minutes in a steam chamber.

The resulting product was fried in the same manner as hamburgers are usually fried and was found to have a taste and texture resembling that of a beef hamburger.

Example 5

PART A

Peanut protein was extracted from peanut meal as described in part A of Example 1. The extract, however, was heated to 95° C. and held at that temperature for only one minute and the protein was precipitated by addition of sufficient aqueous calcium chloride solution, containing 0.25 gram calcium chloride per cc. to make the extract 0.01 M with respect to calcium, and also adding sufficient 3 N hydrochloric acid to lower the pH to 6.3. The precipitated protein was then collected by basket centrifugation and resulted in a suspension having a protein content of 40%.

To 1000 grams of the protein suspension so obtained, there were added 330 cc. of water in which 12 grams of sodium tripolyphosphate had been dissolved. The suspension was thoroughly mixed and ground to a smooth paste. It contained about 30% protein and 0.9% sodium tripolyphosphate. The addition of the sodium tripolyphosphate caused the pH of the suspension to rise to 6.9.

PART B

A portion of the resulting protein gel precursor was rolled into a sheet having a thickness of about ¼". The sheet was placed in a steam chamber and subjected to steaming at 212° F. for 10 minutes. The product, which was partially gelled, was allowed to cool and then cut into roughly 1" squares.

Another portion of the protein gel precursor was converted into a suspension having a solids content of 20% and a pH of 6.3 by the addition of sufficient dilute hydrochloric acid. 20 grams of this adjusted protein suspension, 20 grams of hydrogenated vegetable oil and 3 grams of sausage flavor were then admixed to form a smooth paste. The squares of partially gelled protein were mixed with the paste thus prepared and the entire mass was then passed through a meat grinder equipped with a plate having holes ⅜" in diameter.

The resulting ground mix was stuffed into a synthetic sausage casing ¾" in diameter and tied off into 3" lengths.

The sausages were then placed in an autoclave wherein they were subjected to live steam at atmospheric pressure for 30 minutes and then to steam at 15 p. s. i. g. for 15 minutes. The steam pressure was then reduced, the sausages were allowed to cool and the skins were removed.

The sausages were then fried in the conventional way and found to be pleasantly chewy and particulate.

*Example 6*

PART A

To a suspension of 10 kilograms of solvent-extracted soy flakes in 190 liters of water there were added 600 cc. of an aqueous 2.43 N sodium hydroxide solution. The suspension was stirred for 1 hour, at the end of which time its pH was 7.1. The insoluble matter was removed by basket centrifugation. While stirring, 160 liters of the extract were heated to 95° C. by the introduction of live steam. When this temperature was reached, the pH of the extract was reduced to 4.5 by addition of 2.03 liters of 2.9 N hydrochloric acid, and protein was precipitated. Stirring was continued for 5 minutes while the suspension was maintained at 95° C., whereafter the hot suspension was basket centrifuged to collect the protein. The product collected had a protein solids content of 21%.

To 2000 grams of this protein suspension there were added 120 cc. of 2.43 N aqueous sodium hydroxide. The suspension was thoroughly mixed and milled to break down all particles and had a pH of 7.1. The mass was then placed in a steam-jacketed kettle and, while stirring, was heated to evaporate an amount of water sufficient to raise its protein solids content to 32%.

PART B

The resulting gel precursor was layered into a tray to a height of about ½" and placed in an autoclave in which it was subjected to saturated steam at 15 p. s. i. g. for 15 minutes. After cooling, the resulting protein gel was roughly chopped and shaken on a ¼" mesh sieve. The fraction which did not pass through the sieve was chopped again for a short time and resieved. Chopping and sieving were continued alternately until all of the gel was cut small enough to pass through the sieve.

A paste was made by mixing 4.3 grams skimmed milk powder, 4.3 grams wheat flour and 6.4 grams water, then adding 3.0 grams flavoring and finally mixing in 12 grams of hydrogenated vegetable oil.

60 grams of the chopped gel were then gently mixed with the 30 grams of paste to distribute the paste evenly, care being taken to prevent excessive breakage of the pieces of gel.

The mixture was placed in hamburger molds, as described in Example 4. The molds and their contents were steamed in a steam chamber at 212° F. for 20 minutes. After cooling, the products removed from the molds resembled hamburgers and were cooked as such.

*Example 7*

Peanut protein was extracted from peanut meal and precipitated in the manner described in paragraph 1 of Example 5, with the differences that the extract was not heated prior to addition of calcium chloride solution and hydrochloric acid, the amount of hydrochloric acid added was sufficient to lower the pH to 6.0, and the protein content of the suspension obtained was 50%.

To 1000 grams of the protein suspension thus obtained, there were added 667 cc. of water in which 12.5 grams of sodium tetrapyrophosphate and sufficient hydrochloric acid to bring the tetrapyrophosphate solution to a pH of 6.0 had been dissolved. The protein content of the suspension was thereby reduced to 30%. The mixture was heated for 15 minutes in a steam-jacketed vessel while stirring and then 75 grams of coconut oil were added. After the oil had been thoroughly dispersed, the mixture was poured into a shallow pan to a height of ⅜". This was partially gelled in a steam chamber by steaming at atmospheric pressure for 20 minutes.

Upon cooling, the resulting product was fairly solid and was cut into pieces small enough to pass through a ¼" mesh sieve.

Another part of the 50% solids protein suspension obtained by basket centrifugation was adjusted to a pH of 6.5 and a solids content of 30% protein and 0.6% sodium tripolyphosphate in the manner described in Example 5. Six parts of this protein preparation were mixed with nine parts of hydrogenated vegetable oil and two parts of flavoring material.

One part by weight of the mixture thus prepared and three parts of the chopped, partially gelled protein preparation were intimately mixed, avoiding excessive breaking of the pieces of partially gelled protein. The mix was shaped into patties weighing about 50 grams each. These were placed in supporting wire mesh molds, broiled for one minute on each side and then placed in an autoclave where they were subjected to the action of saturated steam at atmospheric pressure for 10 minutes at 15 p. s. i. g. The steam pressure was then released, the patties were allowed to cool and finally were removed from their containers.

Some of the patties so prepared were fried, others heated in an oven, and still others broiled. They all proved highly edible and simulated hamburgers in texture, chewiness and taste.

*Example 8*

7.5 kilograms of groundnut meal, prepared by solvent extraction of groundnuts from which the large majority of skins had been removed, were suspended in 140 liters of water at about 22° C. Sufficient aqueous alkali was added to raise the pH of the suspension to 7.5. The suspension was stirred for 60 minutes, adding further quantities of alkali as needed to maintain the pH at 7.5. The suspension was then centrifuged to remove the insoluble fraction of the meal.

A 2.4 N solution of hydrochloric acid was added to the cold extract until the pH of the extract was reduced to 5.0. The protein which was thereby precipitated was removed by basket centrifugation to produce a mass having a protein content of 56%.

500 cc. of water were added to one kilogram of this protein suspension and, while the suspension was being mixed vigorously, a 2.5 N aqueous sodium hydroxide solution was added until the pH became 7.1. Additional water was then added to bring the protein solids content of the slurry to 32%. Lumps in the slurry were then thoroughly broken down by passage of the slurry through a colloid mill.

The gel precursor so prepared was deaerated and placed in tinned cans 2⅞" in diameter and 4⅜" in height. The cans were vacuum sealed, placed in a retort and heated with steam at 15 p. s. i. g. for 90 minutes. After cooling, the gelled protein was removed from the cans, roughly chopped, sieved, admixed with a paste of skimmed milk powder, wheat flour, flavor, hydrogenated vegetable oil and water, formed into hamburgers, molded and steamed, all as described in Example 6.

*Example 9*

160 grams of gelled protein, prepared as described in Example 8, were passed through a meat grinder equipped with a plate containing holes ⅜" in diameter. The resulting ground gelled protein was mixed with 40 grams of melted margarin at about 80° C. The total mixture was stirred over a double boiler until it had reached a temperature of 80° C. It was then allowed to cool. To the resulting mixture were added 200 grams of ground beef containing spices, salt, etc. The ingredients were mixed, shaped into a meat loaf, placed in a pan, placed in an oven at 350° F. and baked for 1 hour. The resulting product was very pleasant in taste, texture, aroma and appearance, and was in many respects preferable to a meat loaf prepared with all meat.

*Example 10*

50 grams of commercial casein were suspended in 950 cc. of water. The casein was then brought into solution by the addition of 28 cc. of 1.1 N sodium hydroxide; the pH of the resulting solution was 6.8. The solution was heated to 95° C. and, while it was being mixed, 18.6 cc. of a solution containing 0.295 gram of calcium chloride per cc. were added. A granular mass precipitated; the pH of the suspension was 6. The mass became somewhat stringy on cooling. It contained 36% solids.

The resulting gel precursor was placed in a tray to a height of about ¼" and placed in an autoclave in which it was subjected to saturated steam at 15 p. s. i. g. for 15 minutes. The product was then removed from the autoclave and allowed to cool.

The gel which was thus prepared possessed good structure and marked chewiness and could be shaped much as peanut or soy bean protein gel.

It is evident that numerous modifications will appear to those skilled in the art upon reading the foregoing description. All such modifications are intended to be included in the scope of the invention as defined in the following claims.

We claim:

1. A protein food product simulating the texture of meat and meat products comprising a heterogeneous cohesive mass of unstretched thermostable discrete chewy particles of hydrated unoriented protein gel, and outer additive.

2. A protein food product as set forth in claim 1 wherein the chewy protein gel contains inner additive.

3. A protein food product as set forth in claim 1 wherein the chewy protein gel is derived from a heat denaturable protein.

4. A protein food product as set forth in claim 3 wherein the heat denaturable protein is an oilseed protein.

5. A method of making a protein food product simulating the texture of meat and meat products which comprises adjusting an aqueous dispersion of protein to a protein concentration of from about 18% to about 50% and to a pH of from about 6 to about 8, and, in indifferent order, sub-dividing the dispersion into discrete particles and heating to form a chewy protein gel.

6. A method according to claim 5 wherein the discrete particles are admixed with outer additive.

7. A method according to claim 5 wherein the aqueous dispersion of protein is adjusted to a pH of from about 6.5 to about 7.5.

8. A method according to claim 5 wherein the protein is a heat denaturable protein.

9. A method according to claim 8 wherein the heat denaturable protein is an oilseed protein.

References Cited in the file of this patent

UNITED STATES PATENTS

| 869,371 | Kellogg | Oct. 29, 1907 |
| 2,006,700 | Supplee et al. | July 2, 1935 |
| 2,142,093 | Clickner | Jan. 3, 1939 |
| 2,560,621 | Wrenshall | July 17, 1951 |
| 2,682,466 | Boyer | June 29, 1954 |

FOREIGN PATENTS

| 699,692 | Great Britain | Nov. 11, 1953 |